United States Patent [19]

Inoue

[11] Patent Number: 4,488,962

[45] Date of Patent: Dec. 18, 1984

[54] MAGNETIC FILTERING APPARATUS

[75] Inventor: Kiyoshi Inoue, Tokyo, Japan

[73] Assignee: Inoue-Japax Research Incorporated, Yokohama, Japan

[21] Appl. No.: 338,903

[22] Filed: Jan. 12, 1982

[30] Foreign Application Priority Data

Jan. 16, 1981 [JP] Japan .................................. 56-3821

[51] Int. Cl.[3] .............................................. B01D 35/06

[52] U.S. Cl. .................................... 210/138; 210/223; 210/243; 361/156

[58] Field of Search ............... 210/222, 223, 695, 243, 210/138; 361/156, 145, 197, 208

[56] References Cited

U.S. PATENT DOCUMENTS

| | | | |
|---|---|---|---|
| 3,239,722 | 3/1966 | Menkis | 361/197 |
| 3,477,948 | 11/1969 | Inoue | 210/223 |
| 3,770,629 | 11/1973 | Nolan | 210/222 |
| 3,819,515 | 6/1974 | Allen | 210/222 |
| 3,887,457 | 6/1975 | Marston et al. | 210/222 |
| 4,078,998 | 4/1978 | Order et al. | 210/222 |
| 4,110,222 | 8/1978 | Watson | 210/222 |
| 4,278,549 | 7/1981 | Abrams et al. | 210/222 |

FOREIGN PATENT DOCUMENTS

| | | |
|---|---|---|
| 481305 | 12/1976 | Australia . |
| 2268552 | 4/1975 | France . |
| 1493392 | 11/1977 | United Kingdom . |
| 2047005A | 11/1980 | United Kingdom . |

*Primary Examiner*—Peter Hruskoci
*Attorney, Agent, or Firm*—Karl F. Ross; Herbert Dubno

[57] ABSTRACT

An improved apparatus for magnetically filtering a magnetically susceptible component in a fluid with a matrix of magnetizable material which, when magnetized, provides a multiplicity of regions of high magnetic field gradient. A sequence of time-spaced impulsive magnetic fluxes are produced in an electromagnetic coil by periodically charging and discharging capacitor connected to the coil, the fluxes being concentrated across the magnetic matrix to magnetically collect the magnetically susceptible component in the regions of high field gradient therein. A static magnetic flux may also be provided in the magnetic matrix by a permanent magnet included in a magnetic circuit with the matrix.

11 Claims, 4 Drawing Figures

MAGNETIC FILTERING APPARATUS

FIELD OF THE INVENTION

The present invention relates in general to magnetic filtration and, more particularly, to a novel and improved apparatus for filtering a magnetically susceptible material in a fluid utilizing a magnetic flux, especially together with a matrix of a material magnetizable thereby to provide a multiplicity of regions of high magnetic field gradient therein.

BACKGROUND OF THE INVENTION

In filtering methods and devices of the type concerned, a filterable fluid is passed through a column containing a magnetizable material of a porous structure, such as a magnetic grade stainless steel wool, the column being called a matrix. The matrix is placed under an external magnetic field sufficient in magnitude to effect magnetization and provides a large number of regions of very high magnetic field and magnetic field gradient along the paths of travel of the fluid to attract and retain the magnetic components therein.

The external magnetic field to the magnetic matrix may be produced with a permanent magnet constructed and arranged in a magnetic path with the matrix. It has been found, however, that the magnetic flux that a permanent magnet provides is most often insufficient to meet this end and further is reduced in magnitude and hence becomes ineffective as time of service elapses. Resort has therefore been had by the prior art to the use of an electromagnet energized by a continuous DC magnetization current. While an electromagnet is capable of producing a desirable magnet flux sufficient in magnitude, it has been found that it is extremeful wasteful of electric power and hence is quite low in efficiency.

OBJECTS OF THE INVENTION

It is, accordingly, an important object of the present invention to provide a new and improved apparatus for filtering a magnetically susceptible material in a fluid.

Specifically, the present invention seeks to provide a magnetic filtering apparatus of the type described above which is both extremely effective and efficient.

SUMMARY OF THE INVENTION

In accordance with the present invention there is provided, in a first aspect thereof, a method of filtering a magnetically susceptible material in a fluid, which method comprises the steps of: (a) passing the fluid through a magnetic matrix constituted by a porous mass of magnetizable material and received in an enclosure; (b) charging a capacitor from a direct-current source; (c) impulsively discharging charges stored on the capacitor through an electromagnetic coil to produce an impulsive magnetic flux traversing the coil; (d) concentrating the impulsive magnetic flux through the magnetic matrix in the enclosure to magnetically collect the magnetically susceptible material therein whereby the concentrating magnetic flux gradually decays; and (e) cyclically repeating a sequence of steps (b), (c) and (d) while passing the fluid through the magnetic matrix.

Specifically, the impulsive magnetic flux may be concentrated through the magnetic matrix in a closed magnetic path including a core member surrounded by the electromagnetic coil, and the core member may advantageously be composed of a semi-hard magnetic (i.e. magnetically semi-hard) material, e.g. an iron-chromium-cobalt base spinodal decomposition-type alloy.

The method may further comprise the step of flushing the magnetic matrix by (f) charging the capacitor from a directcurrent source with a polarity opposite to that with which it is charged in step (b), and (g) discharging charge stored on the capacitor in step (f) through the electromagnetic coil to essentially demagnetize the semi-hard magnetic core member and cancel the magnetic flux remaining across the magnetic matrix, and (h) passing a rinsing fluid through the magnetic matrix.

A permanent magnet composed of a hard magnetic material, e.g. an aluminum-nickel-cobalt alloy, a rare-earth or an iron-chromium-cobalt alloy may be disposed in a magnetic path formed by the electromagnetic coil and the magnetic matrix to produce a static magnetic flux in the magnetic path and on this static flux may be superimposed a sequence of the impulsive magnetic fluxes.

The magnetic matrix is preferably a porous mass of magnetizable material which, when magnetized, provides a multiplicity of regions of high magnetic field gradient therein. The matrix may thus be in the form of wool or a mass of small tapes or ribbons and may be composed of a magnetic grade stainless steel or an amorphous magnetic substance. Alternatively, the matrix may be a porous body of non-magnetic material, e.g. plastic, having the walls of its internal pores coated with a magnetizable material, e.g. nickel-iron alloy.

The invention also provides, in a second aspect thereof, an apparatus for filtering a magnetically susceptible material in a fluid, which apparatus comprises: a magnetic matrix received in an enclosure; means for passing the fluid through the magnetic matrix in the enclosure; a direct-current source; a capacitor chargeable by the direct-current source; circuit means for intermittently impulsively discharging charge stored on the capacitor through an electromagnetic coil to produce an impulsive magnetic flux therein; a magnetic path for concentrating the impulsive magnetic flux through the magnetic matrix in the enclosure to magnetically entrap the magnetically susceptible material at multiple regions of high field gradient therein whereby the concentrated magnetic flux gradually decays; and means for recharging said capacitor after each said impulsive discharge by said circuit means.

BRIEF DESCRIPTION OF THE DRAWING

These and other objects and features of the present invention as well as advantages thereof will become more readily apparent from the following description of certain preferred embodiments thereof made with reference to the accompanying drawing in which.

SPECIFIC DESCRIPTION

Figure 1:
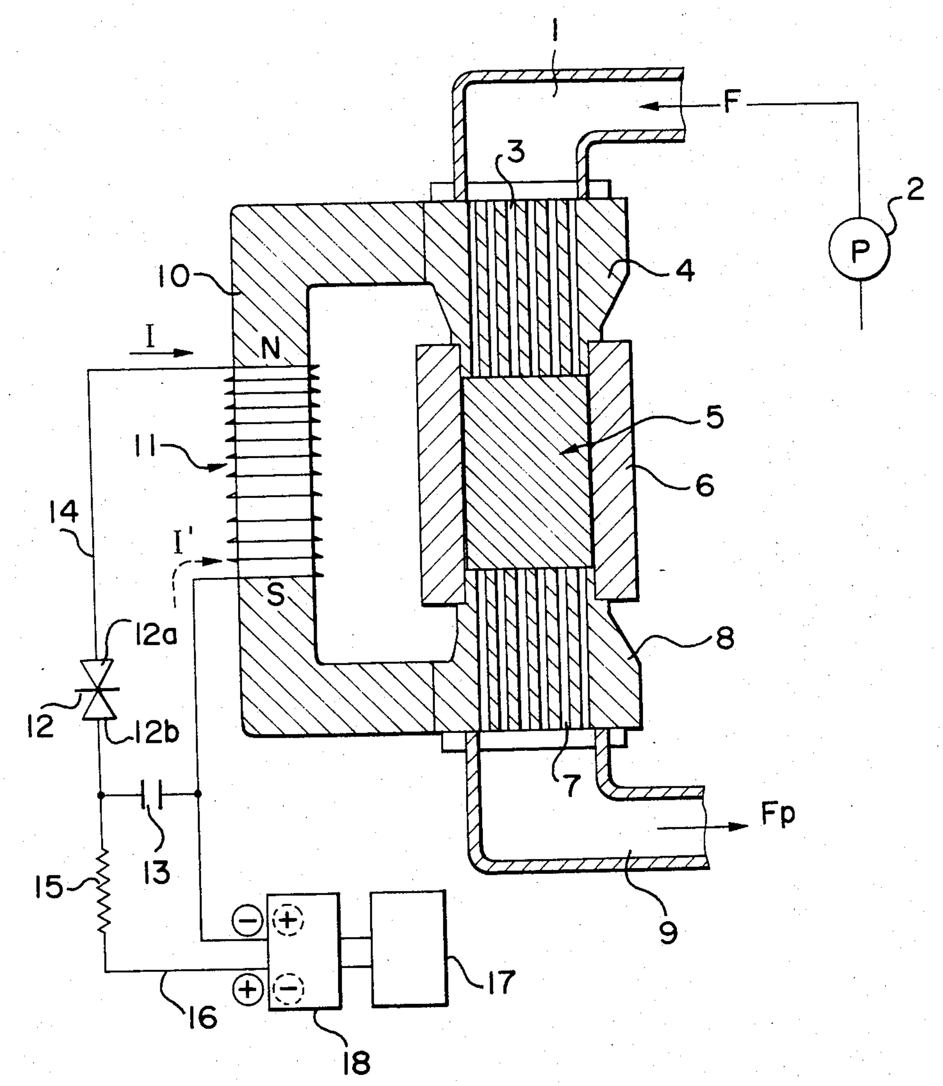
FIG. 1 is a view shown essentially in cross-section and also in a circuit-diagram form, schematically illustrating one embodiment of the invention.
Figure 2:
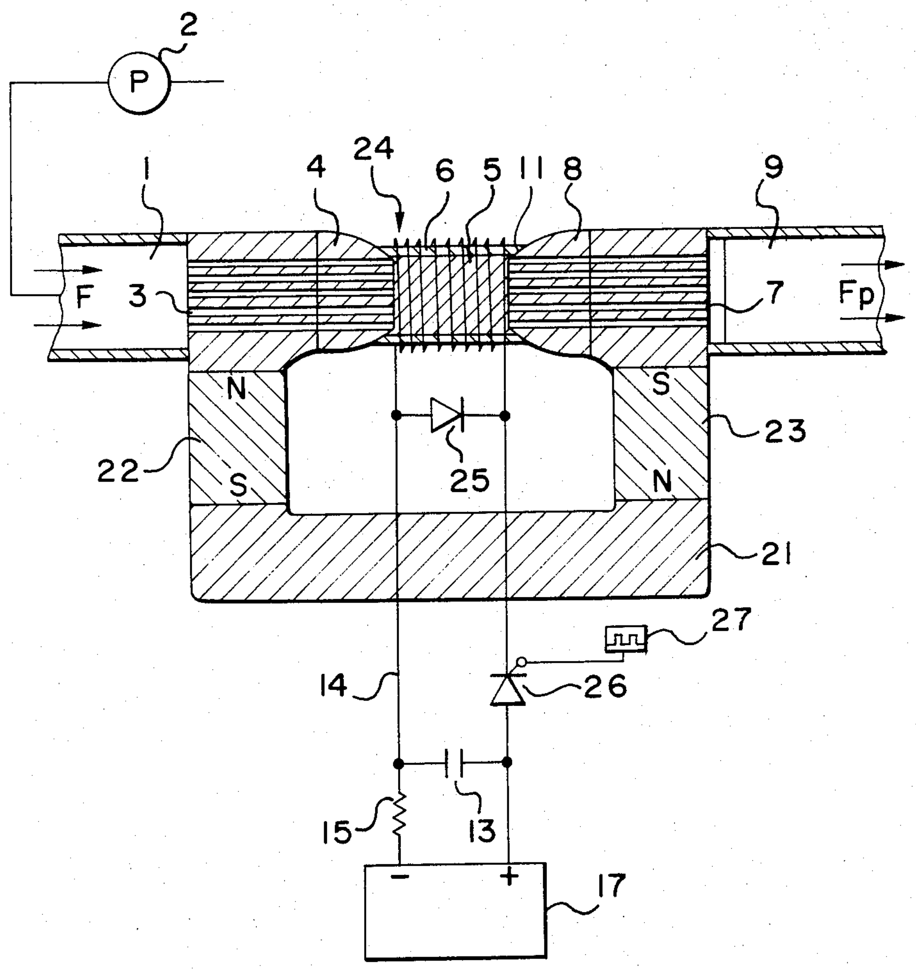
FIG. 2 is a similar view diagrammatically illustrating another embodiment of the invention.

In both embodiments of FIGS. 1 and 2 a fluid F containing a magnetically susceptible material continuously fed into an inlet duct 1 under pressure exerted by a pump 2 continuously passes through plural inlet passages 3 formed in a magnetically permeable member 4 and through a magnetic matrix 5. The latter is received in an enclosure 6 composed of a non-magnetic material, e.g. plastic, and is a porous columnar mass of magnetizable material which, when magnetized under an external magnetic field of sufficient field intensity, provides a multiplicity of regions of very high magnetic field and magnetic field gradient therein. The matrix 5 is, for example, a magnetic grade stainless steel wool, and may generally be a mass of fibers, strands, chips, grains, tapes or ribbons composed of a magnetizable material, say, a magnetic grade stainless steel or an amorphous magnetic substance. Alternatively, the matrix 5 may be formed of a foamed plastic body having the walls of its interconnected pores therein coated (e.g. by chemical plating) with an magnetizable material or having fine particles of magnetizable material uniformly distributed therein. A mass of non-magnetic fibers or a stack of mesh screens of non-magnetic material coated with a magnetizable metal or alloy may also be used as the magnetic matrix 5. The fluid F, magnetically filtered through the matrix 5, then passes through plural outlet passages 7 formed in a magnetically permeable member 8 and is discharged through an outlet duct 9 as a purified fluid Fp.

In the arrangement of FIG. 1, a closed magnetic path including the magnetically permeable member 4, the magnetic matrix 6 and the magnetically permeable member 8 is completed by a yoke 10 of magnetizable material which is composed preferably of a semi-hard magnetic alloy having a coercive force ranging between 100 and 400 Oersteds. A preferred example of such a semi-hard magnetic alloy is an iron-chromium-cobalt base alloy prepared to exhibit magnetically semi-hard properties. The yoke 10 has a coil 11 would thereon, the coil being connected in series with a bidirectional diode element 12 comprising a pair of diodes 12*a* and 12*b* and arranged as shown in a discharge circuit 14 across a capacitor 13 which is chargeable via a resistor 15 in a charging circuit 16 by a DC source 17. A polarity reversal switch 18 is connected in the charging circuit 16.

Figure 3:
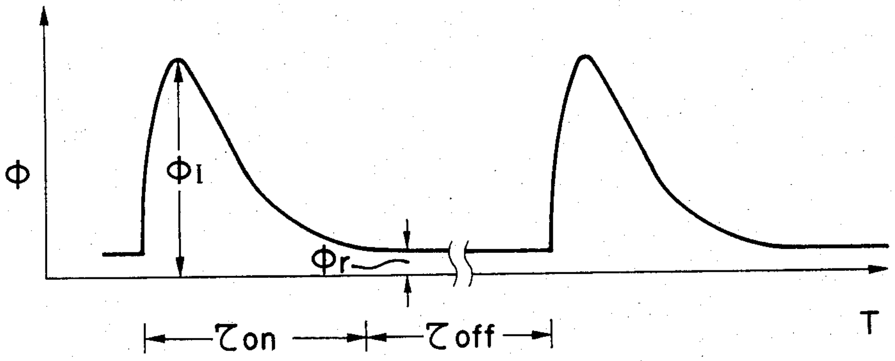
FIG. 3 is a waveform diagram illustrating a sequence of impulsive magnetic fluxes ($\phi$) which developed across a magnetic matrix in the system of FIG. 1.

In the magnetic filtering operation, the polarity switch 18 develops a DC output with the polarity indicated by signs shown in the solid circles and the capacitor 13 is charged via the charging resistor 15 by this DC output. When the charging voltage on the capacitor 13 exceeds a breakdown level of the diode 12*a*, the accumulated charges on the capacitor 13 are impulsively discharged through the coil 11 with a peak current I, thereby developing an impulsive magnetic flux through the yoke 10 traversing the coil 11. The magnetic flux that develops through the yoke 10 is in the form of an impulse as shown in FIG. 3 and rises rapidly to a peak value $\phi_I$. The yoke 10 and the members 4 and 8 forming the magnetic path serve to concentrate the impulsive magnetic flux $\phi$ through the magnetic matrix 5 in the enclosure 6, thereby magnetically entrapping the magnetically susceptible component in the fluid F in the multiple regions of very high magnetic gradient in the matrix 5. When the yoke 10 is composed of a soft magnetic (magnetically soft) material, the impulsive magnetic flux $\phi$ that develops across the matrix 5, as generally depicted in FIG. 3, substantially coincides in waveform with the impulsive discharge current passing through the coil 11. When the yoke 11 is composed of a semi-hard magnetic material, the magnetic flux that develops impulsively tends to retain its saturation level $\phi_I$. With the progress of magnetic trapping in the high field gradient regions, however, a counter magnetic field develops and grows across the magnetic matrix 5 so that the effective magnetic flux thereacross gradually decays and eventually levels down to a residual flux level $\phi_r$. The counter magnetic field develops to a greater or lesser extent, regardless of whether the yoke 10 is composed of a semi-hard or relatively soft magnetic material. When the impulsive magnetic flux levels down to the residual level $\phi_r$ and thus terminates with a duration $\tau$on, the capacitor 13 is allowed to be recharged by the DC output from the source 17. After an interval $\tau$off, the charges accumulated on the capacitor 13 are discharged through the electromagnetic coil 11, again producing an impulsive magnetic flux therein and thereby magnetizing the yoke 10. The time interval $\tau$off may be adjusted by the charging resistor 15 and should be of a sufficiently short period such that the magnetically susceptible component collected may escape but may remain entrapped in the high-field gradient regions in the matrix 5. It has been found that a time period $\tau$off ranging between 1 and 10 milliseconds is generally sufficient and satisfactory. The duration $\tau$on should generally range upwards of 100 microseconds but generally need not exceed 1 millisecond.

The duration $\tau$off of impulsive magnetic flux is determined by an expression:

$$\tau\text{on} \propto \sqrt{L \cdot C} \tag{1}$$

The peak level $\phi_I$ of impulsive magnetic flux is proportional to the charging voltage $E_o$ of the DC source 17 as follows:

$$\phi_I \propto E_o \sqrt{C/L} \tag{2}$$

In a typical example, the duration $\tau$on may be set at 500 microseconds, the peak discharge current I at 200 amperes and the time interval $\tau$off at 5 milliseconds. With the yoke 10 composed of a Fe/Cr/Co alloy of semi-hard properties, the impulsive magnetic flux $\phi$ may have a peak level $\phi_I$ equivalent to a flux density of 8000 Gauss and gradually decays to a residual flux level of 800 Gauss which persists during the time interval $\tau$off. A contaminated machining liquid drained from a wire-cut EDM (electrical discharge machining) machine is continuously passed at a flow rate of 10 cm/sec through a matrix 5 of magnetic grade stainless steel wool in the arrangement shown in FIG. 1. It has been found that 98% of the machining chips in the liquid is filtered out.

In a flushing operation, the polarity switching stage 18 is operated to provide the reversed polarity as indicated by signs shown in broken circles in FIG. 1 and thus to allow the capacitor 13 to be charged from the DC source 17 with the reversed polarity. When the charging voltage exceeds a threshold level established by the breakdown diode 12*b*, the charges on the capacitor 13 are discharged through the electromagnetic coil 11. The discharge current I' thus passes through the coil 11 in the direction of dotted arrow to produce an impulsive magnetic flux of the opposite polarity therein, thereby demagnetizing the semi-hard magnetic yoke 10 and removing the residual flux $\phi_r$ from the magnetic system. This provides a complete demagnetization of the matrix 5 to free the collected magnetic components from magnetic attraction therein and thus to allow them to be flushed away with a rinsing fluid.

Figure 4:
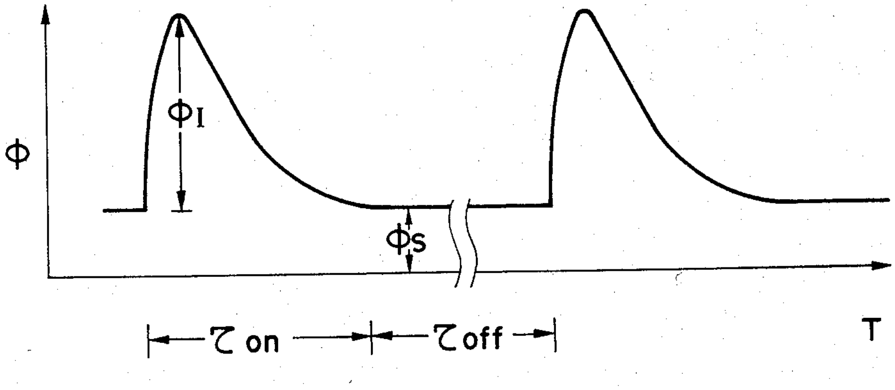
FIG. 4 is a waveform diagram illustrating a sequence of impulsive magnetic fluxes superimposed upon a static magnetic flux which develop across the magnetic matrix in the system of FIG. 2.

In the embodiment shown in FIG. 2, a closed magnetic path is constituted by a matrix 5 of magnetizable material and the pair of magnetically permeable members 4 and 8 as already shown and described, as well as a yoke 21 of magnetically permeable material and permanent magnets 22 and 23 disposed between the member 4 and the yoke 21 and between the member 8 and the yoke 21, respectively. In this embodiment, these permanent magnets which may be of a relatively low flux density output (Gauss) provides a static magnetic flux $\phi_s$, and an electromagnetic coil 24 is provided surrounding the enclosure 5 accommodating the matrix 5 to provide a sequence of time-spaced impulsive magnetic fluxes $\phi_I$ as already described in superimposition upon the static magnetic $\phi_s$. The waveform of the composite magnetic flux $\phi$ is depicted in FIG. 4.

In the arrangement of FIG. 2 the electromagnetic coil 24 is connected across a capacitor 13 and shunted by a diode 25 designed to remove a voltage spike of reverse polarity. A thyristor 26 is connected in the discharge circuit 14 of the capacitor 13 in series with the coil 24 and is operated by a control signal generator 27 which periodically turns on the thyristor 26 to periodically discharge the charges accumulated on the capacitor 13 via a charging resistor 15 from the DC source 17, thereby providing a sequence of impulsive magnetic fluxes locally across the magnetic matrix 5 under a static magnetic field $\phi_s$. A peak magnetic flux $\phi_I+\phi_s$ in exess of 10 kiligauss is thus readily obtained. Here again, the duration $\tau$on of an impulsive magnetic flux should generally be in excess of 100 microseconds but generally need not be in excess of 1 millisecond, and the time interval $\tau$off between successive impulsive magnetic fluxes should generally range between 1 and 10 milliseconds.

What is claimed is:

1. An apparatus for filtering a magnetically susceptible substance in a fluid, comprising:
   - a matrix of magnetizable material which, when magnetized, provides a multiplicity of regions of high magnetic field gradients and which is received in an enclosure;
   - means for passing said fluid through said matrix in said enclosure;
   - external magnetic circuit means for magnetizing said matrix to magnetically collect said magnetically susceptible substance from said fluid, said magnetic circuit means including a field generating coil and a magnetic conductor arranged to form a closed magnetic circuit with said matrix and with said field generating coil;
   - power supply means for passing a succession of electrical impulses through said field generating coil to intermittently energize the same, thereby producing a sequence of impulsive magnetic fluxes in said magnetic circuit to recurrently intensify magnetization of said matrix, said power supply means comprising a capacitor chargeable from a direct-current source and connected via switch means with said coil so as to be dischareable through said coil each time said switch means is rendered conductive to produce in said coil each said electrical impulse having a magnitude sufficient to increase said magnetic field gradients in said matrix; and
   - at least one hard or semi-hard magnet arranged in series with said matrix in said magnetic circuit for producing a generally static magnetic flux therein sufficient to maintain said matrix magnetized each time said electric impulse passing through said field generating coil decays.

2. The apparatus defined in claim 1 wherein said field generating coil is arranged to surround at least a portion of said matrix for superimposing said each impulsive magnetic flux upon said static magnetic flux across said matrix while said switch means is conductive.

3. The apparatus defined in claim 1 wherein said magnet tends to progressively demagnetize with an increase in the amount of said substance entrapped in said matrix and said field generating coil is arranged to surround at least a portion of said magnet for energization with said electrical impulses from said capacitor to re-magnetize said demagnetized magnet each time said switch means is rendered conductive.

4. The apparatus defined in claim 1 wherein said capacitor upon discharging through said coil is chargeable by said direct-current source to build up a charging voltage thereon and said switch means is arranged to be rendered conductive when said charging voltage on the capacitor exceeds a predetermined level.

5. The apparatus defined in claim 1 wherein said switch means is associated with timing circuit means for periodically rendering it conductive to develop a succession of said electrical impulses in said coil.

6. The apparatus defined in claim 1 wherein said at least one magnet is composed of at least one material selected from the group which consists of aluminum-nickel cobalt alloys, rare-earth alloys and iron-chromium-cobalt alloys.

7. The apparatus defined in claim 1 wherein said at least one magnet has a coercive force ranging between 100 and 400 Oersteds.

8. The apparatus defined in claim 7 wherein said at least one magnet is composed of an iron-chromium base spinodal-decomposition type magnetic alloy.

9. The apparatus defined in claim 1, further comprising polarity reversing means associated with said power supply means and selectively operable, for flushing said matrix, to discharge said capacitor upon charging by said direct-current source to discharge through said coil so as to produce therein an electrical impulse opposite in polarity to the first-mentioned electrical impulse and having a magnitude sufficient to develop in said magnetic circuit a counter-magnetic field capable of substantially completely demagnetizing said magnet to substantially release said magnetically entrapped substance from said matrix.

10. The apparatus defined in claim 1 wherein said matrix is in the form selected from the group which consists of a wool and a mass of small tapes and is composed of at least one material selected from the group which consists of stainless steel and amorphous magnetic substances.

11. The apparatus defined in claim 1 wherein said matrix is in the form of a porous body of non-magnetic material having the wall of its internal pores coated with a film of magnetizable material.

* * * * *